United States Patent [19]

Rympalski et al.

[11] Patent Number: 4,639,720

[45] Date of Patent: Jan. 27, 1987

[54] ELECTRONIC SKETCH PAD

[75] Inventors: William P. Rympalski, Melbourne; James S. Herstein, Satellite Beach; Roger L. Ritenour, Palm Bay, all of Fla.

[73] Assignee: Harris Corporation, Melbourne, Fla.

[21] Appl. No.: 224,067

[22] Filed: Jan. 12, 1981

[51] Int. Cl.⁴ .............................................. G09G 3/00
[52] U.S. Cl. .................................. 340/712; 340/707; 340/365 C
[58] Field of Search ............... 340/707, 712, 784, 706, 340/365 C, 708, 365 S; 178/18-20

[56] References Cited

U.S. PATENT DOCUMENTS

| | | | |
|---|---|---|---|
| 3,128,458 | 4/1964 | Romero | 340/706 |
| 3,932,862 | 1/1976 | Graven | 340/707 |
| 4,177,354 | 12/1979 | Matthews | 340/707 |
| 4,224,615 | 9/1980 | Penz | 340/712 |
| 4,232,311 | 11/1980 | Agneta | 340/707 |
| 4,257,117 | 3/1981 | Besson | 340/365 C |
| 4,290,052 | 9/1981 | Eichelberger et al. | 340/365 C |
| 4,290,061 | 9/1981 | Serrano | 340/712 |
| 4,373,784 | 2/1983 | Nonomura et al. | 340/784 |

*Primary Examiner*—Marshall M. Curtis
*Attorney, Agent, or Firm*—Antonelli, Terry & Wands

[57] ABSTRACT

A graphics input/output device contains a graphics input pad having an array of transparent capacitive pixels the capacitance characteristics of which are changed in response to the passing of a conductive-tipped stylus over the surface of the pad. This change in capacitance is sensed by sense buffers disposed along the columns of the matrix, as the rows are scanned at a prescribed scanning rate.

The sensed data is read out of the sense buffer and loaded into a RAM. An array of display pixels formed of an LCD matrix is addressed by a scan sequence control unit, and the energization of the display pixels is multiplexed with the read-out scanning of the sensed data, so as to present to the user a real time generated image of the graphics created by the stylus. As a result, it appears to the user that the stylus is actually "writing" on the display pad.

30 Claims, 13 Drawing Figures

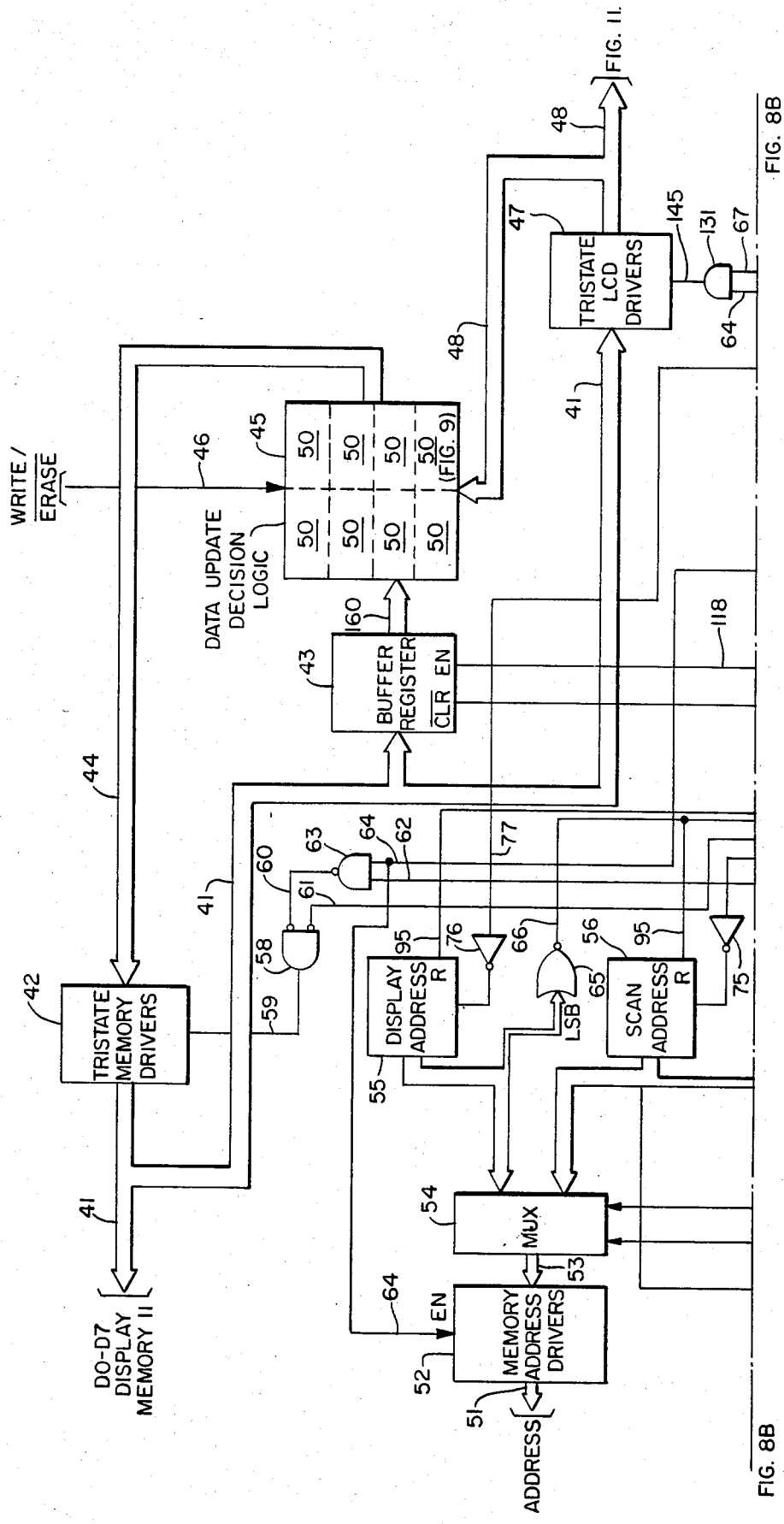

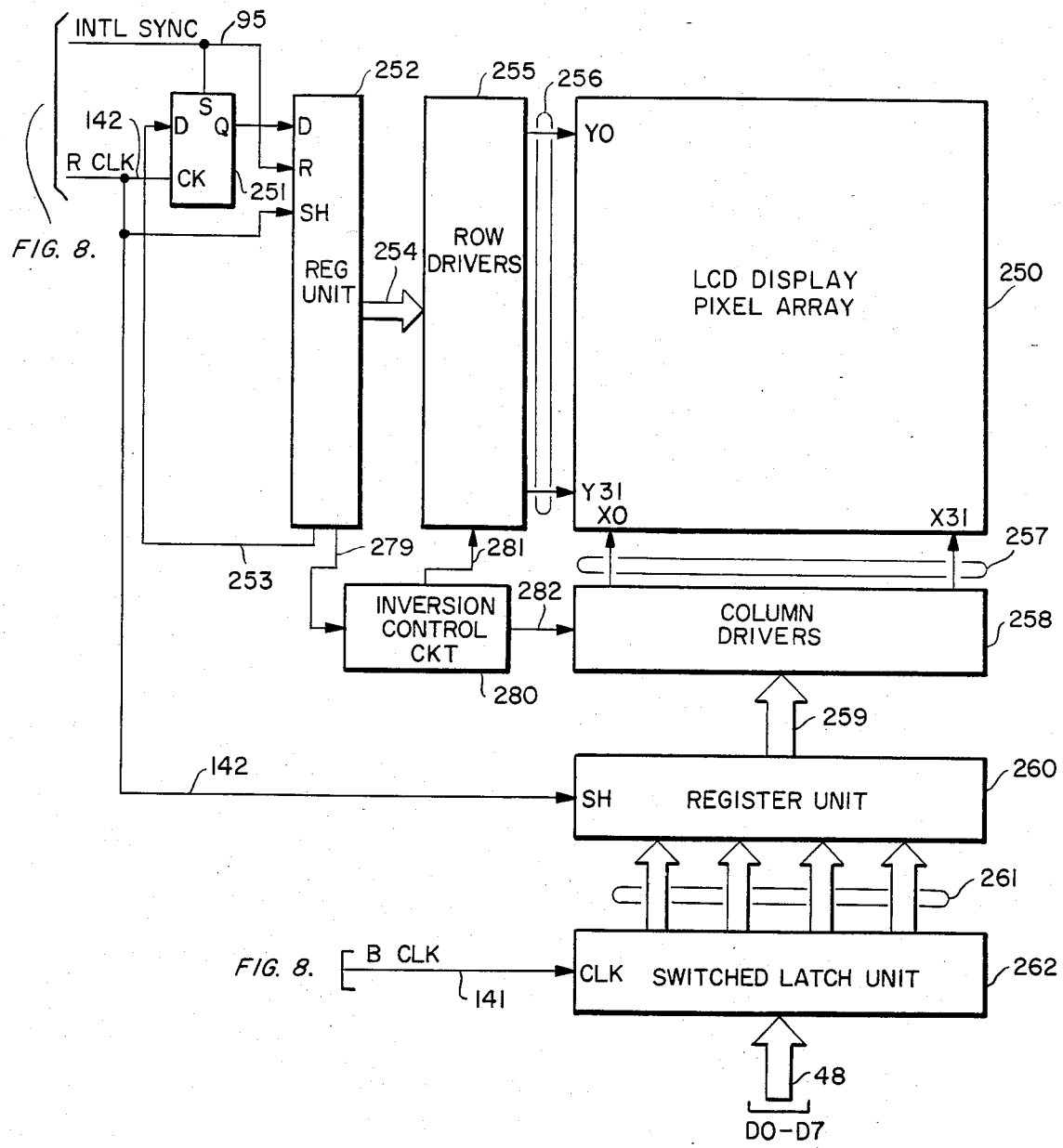

ELECTRONIC SKETCH PAD

FIELD OF THE INVENTION

The present invention relates to a graphic transducer device that is capable of accepting and storing user written graphics as may be applied to the device by a hand-held stylus. The invention also relates to a device associated with the transducer for providing a display of the graphics being concurrently written on the surface of the transducer device.

BACKGROUND OF THE INVENTION

Recent technological developments in information exchange systems have witnessed proposals to replace keyboards or scanners as the fundamental message entry device. Generally these proposals entail some form of coordinate position input transducer upon which the user enters graphics data by means of a stylus, such as a light pen, shorting conductive rod stylus, etc. An array of signal pick-up elements located within or coupled integrally to the transducer produce output signals representative of specified or selected coordinate locations over which the input coupling element (e.g. stylus) travels as the user writes the graphics on the transducer. These signals are then processed (e.g. encoded, stored, etc.) and may be used to address a matrix-type display device through which the graphics generated by the user may be displayed for viewing. In addition to cathode-ray tube displays which typically respond to user-generated graphic input signals produced by a light beam stylus, there have been proposed schemes whereby the display device is of a relatively compact size and lies directly beneath the input transducer, so that the stylus appears to create a graphics display image at its coordinate points of contact with the device. For an exemplary illustration of these types of devices, attention may be directed to U.S. Pat. Nos. 4,177,354 to Matthews and 3,944,740 to Murase et al. The former patent describes a device whereby a light pen is used to cause local conduction of the input transducer through a photosensitive layer separating a conductive and a resistive plane. The coordinates of the light pen stylus are derived from the voltage level detected at the top conductive plane, and then processed for display via a display assembly such as a CRT unit, upon which the graphics entry transducer may be placed. This type of device has the disadvantage of being light sensitive, so that high ambient light or a light-emitting display could degrade its performance, the light pen scans only a single matrix transducer point at a time and the processing of the data for storage and display, as well as the display itself (CRT), requires a significant amount of hardware and high power requirements.

The scheme proposed in U.S. Pat. No. 3,944,740 is an attempt at a reduced-size or compact configuration of a combined graphics input/output device and, for this purpose, it employs a transparent input pad mounted over the top of a plasma panel display. The input pad is a matrix of conductive rows and columns that are arranged so that a stylus having a conductive tip can short circuit a row electrode and a column electrode at its point of contact, with current conducted through the row and column electrodes representing the stylus location. The plasma display has an inherent memory capability which is employed to provide a one-for-one storage and display function for each short circuit contact point of the stylus. Because of its reliance on the memory property of the plasma display, selective control of the display graphics and addressing the display from external memory are not possible, so as to substantially limit its adaptability to other data I/O interfaces such as external communications and memory.

In addition to the above-described proposals, there are various other coordinate display or hand-held or touch-responsive transducer arrangements, some for input data resolving alone, others for graphics input and display. However, these devices also suffer from a lack of versatility (they are capable of locating only one coordinate point at a time) and consume considerable power and involve complex hardware, thereby reducing their cost effectiveness and practical utility for the graphics message writer. For an overview of such proposals, attention may be directed to the U.S. Pat. Nos. 3,757,322 to Barkan; 4,030,091 to Ngo; 3,342,935 to Leifer et al.; 3,530,241 to Ellis; 3,699,439 to Turner; 4,055,726 to Turner et al.; 3,958,234 to Hoo; and 4,121,204 Welch et al.

SUMMARY OF THE INVENTION

In accordance with the present invention, there is provided a new and improved graphics input/output device which overcomes the shortcomings of prior art proposals, through a scheme that offers simplicity, versatility and low power consumption, together with considerable ease of operation. To this end, the unit employs a graphics input pad or plate containing an array or matrix of transparent capacitive coupling-responsive conductors, the capacitance characteristics of which are changed in response to the passing of a conductive-tipped stylus over the surface of the graphics input pad. As the stylus tip passes over the pad surface, it is capacitively coupled to one or more pairs (depending upon stylus tip contact area as may be imparted by user hand pressure) of row and column-arranged conductor electrode regions, thereby changing their normal capacitance. This change in capacitance is sensed by sense buffers disposed along the columns, as the rows are scanned at a prescribed scanning rate.

The sensed data is read out of the sense buffer and loaded into a random access memory (RAM) under the control of a scan sequence control circuit. An array of display pixels formed of a liquid crystal display (LCD) matrix, corresponding in number and position to the X-Y intersections of the electrodes of the graphics input pad, is addressed by the scan sequence control unit and the energization of the display pixels is multiplexed with the read-out scanning of the sensed data, so as to present to the user a real time generated image of the graphics created by the stylus, so that it appears to the user that the stylus is actually "writing" on the display pad. In addition to its writing capability, the electronic sketch pad of the present invention may operate in an erase mode, whereby the user may selectively 25 erase previously written graphics from the display, employing the same stylus used for writing. In this mode, combinational logic within the scan sequence control unit logically combines the data stored in the display memory with that obtained from the sense buffer, so as to change the states of the bits corresponding to graphics stored in memory over which the now-erasing stylus passes. During the display cycle, this new data is delivered to the LCD screen whereby the erasure action of the writer is presented as removed graphics.

A further feature of the present invention provides written graphics to be stored for retrieval at a later time, with the writing/display surface being cleared for accepting new graphics. In this embodiment of the invention, multiple display memory units are employed. This feature also enables stored graphics to be selectively coupled for external communication via a suitable modem interface unit. Another feature of the present invention permits the electronic sketch pad, when coupled to a suitable computer with image processing capability, to serve as a new form of interactive graphics computer terminal.

BRIEF DESCRIPTION OF THE DRAWINGS

FIGS. 8A and 8B are a schematic logic diagram of a scanning control sequencer;

FIG. 9A is a truth table for explaining the operation of the logic of FIG. 9;

FIG. 11 is a schematic block diagram of the LCD scan electronics.

DETAILED DESCRIPTION

Figure 1:
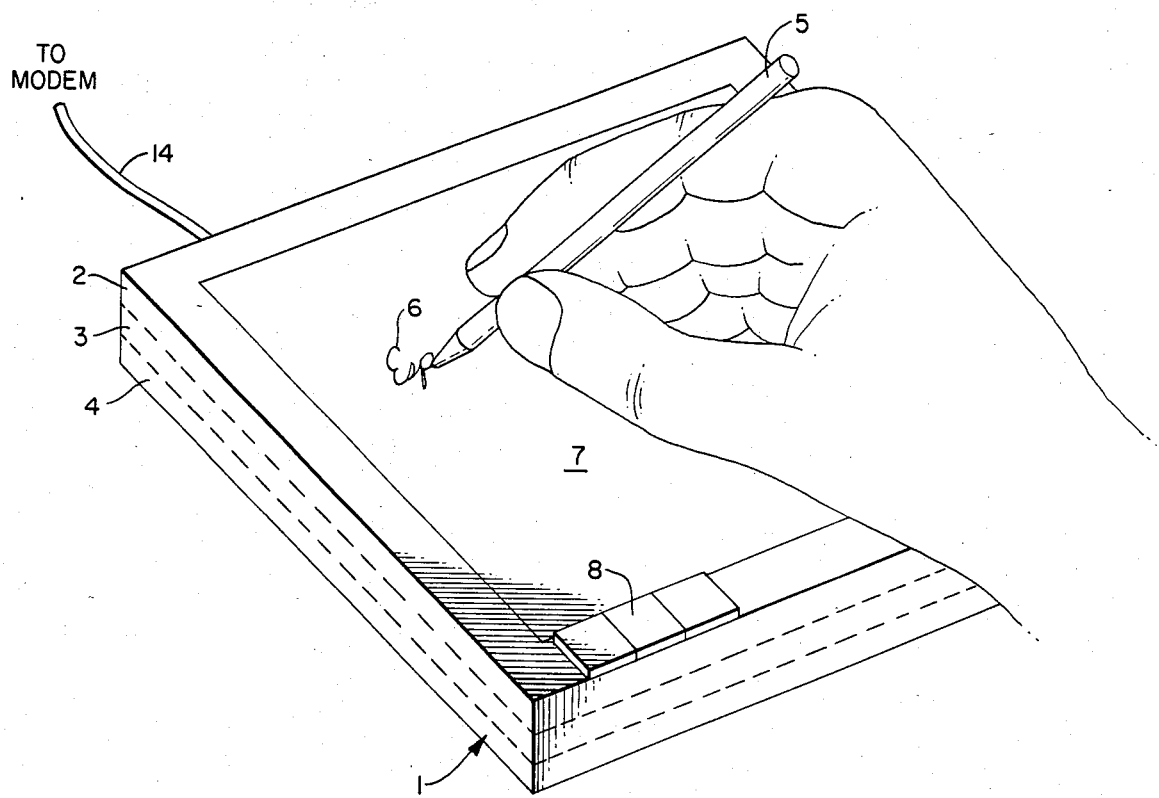
FIG. 1 is a pictorial view of the physical configuration of an electronic sketch pad according to the present invention.

A pictorial view of the physical configuration of an electronic sketch pad according to the present invention is shown in FIG. 1. The sketch pad 1 is a multilayered device having a top or upper transparent capacitance input matrix pad 2, beneath which there is disposed an LCD matrix output or display pad 3. Beneath display pad 3 is an input/output and power pack unit 4 containing scan control electronics and drive circuitry for the pads 2 and 3, which may be implemented in accordance with large scale integration (LSI) techniques.

The upper transparent capacitance input matrix pad 2, a detailed description of which will be presented below in conjunction with the description of FIG. 3, may be formed of an Indium Tin Oxide thin film array of transparent conductive regions deposited on a glass plate and connected in a row and column configuration. The array of regions corresponds to a like array of pixels of display pad 3 atop which pad 2 is superimposed. Both pads 2 and 3 may be connected to unit 4 through strips of conductive elastomer.

The generation of input graphic data may be effected by means of a hand-held writing stylus 5. Stylus 5, to be described in greater detail below in conjunction with the description of FIG. 6, may be formed of a plastic rod, having the size and shape of an ordinary pencil. The writing tip of stylus 5 may be formed of silicon rubber that has been impregnated with metal (e.g. silver) particles. As the tip of stylus 5 is passed over the writing surface 7 of pad 2, it capacitively couples X-Y pairs of transparent conductive regions to each other, thereby altering their normal capacitance. This change in capacitance is sensed by a sense buffer, and is coupled to the electronics processing pad 4, in response to the operation of the matrix scan electronics.

Data stored in the buffers is continually loaded into a static random access display memory contained in the electronics pad 4. During this time, the pixels of display pad 3 are energized in real time, corresponding to the stored sensed changed capacitance data, as the stylus 5 is moved over the surface 7 of pad 2. As there is a physical one-for-one correspondence between row-column capacitance coupling regions in input pad 2, and display pixels in display pad 3, and also an electrical correspondence to storage locations in the static RAM, the LCD pixels are energized by the display memory readout at the same input capacitance coupling locations over which stylus 5 is passed. As a result, there is effectively presented a real time graphical presentation of the track 6 of stylus 5 directly beneath writing surface 7, so that stylus 5 appears to be writing the graphics at its point of contact with input pad 2.

Also provided on upper pad 2 is a set of control switches 8 coupled to the scan control and display memory circuitry of pad 4. Through the operation of these switches, the user of the pad may selectively control the mode of operation of the pad. More specifically, an INITIALIZE switch through which the pad is cleared for the start of operation. The function of such a switch will be described in detail below in conjunction with the detailed description of FIGS. 8A and 8B. The switch set may also include a WRITE/ERASE (ER) switch that is used to selectively erase graphics previously written on the pad. The selective erasure is accomplished by depressing the WRITE/ERASE switch and passing stylus 5 over previously written graphics. In addition, the set of switches may include one or more switches for externally controlling the selective coupling of data to and from additional memory. Through the operation of these switches, graphics written on display pad 3 may be entered into one section of memory, so that new graphics may be written on the pad using additional memory space. Similarly, previously stored graphics may be displayed without the use of the stylus. A detailed description of the effect of such external control of these switches will be presented below in conjunction with the description of the details of the data storage and signal processing circuitry.

Figure 2:
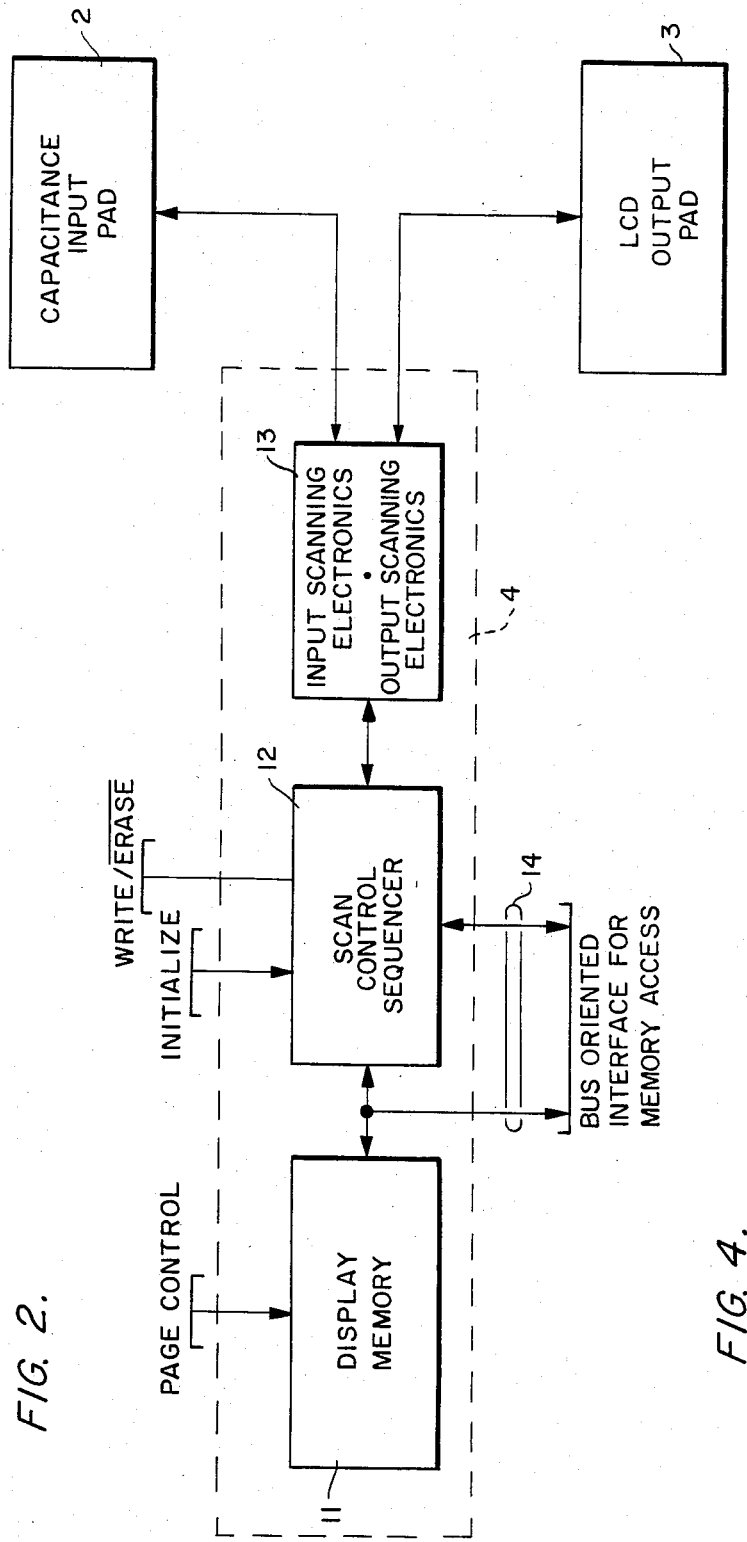
FIG. 2 is a general block diagram of the data storage and signal processing circuitry of the control circuitry portion of the electronic sketch pad.

A general block diagram of the data storage and signal processing circuitry of the electronic sketch pad, shown pictorially in FIG. 1, is presented in FIG. 2. Each of the transparent capacitance input pad 2 and LCD output pad 3 is coupled to input/output scanning electronics unit 13, the details of which will be described below in conjunction with the description of FIGS. 10 and 11. I/O scanning electronics 13 contains a pair of separate scanning subunits, one for the capacitance input pad and one for the output display pad. The subunit for the input pad scans the matrix of conductive regions of capacitance input pad 2 to read out changes in capacitance at row/column intersections that have occurred as a result of the passing of the writing stylus 5 over the surface of pad 2. Similarly, for the LCD output pad 3, the output pad subunit of I/O scanning electronics unit 13 carries out refresh scanning of the display pixels in accordance with data that has been stored in a display memory 11. Display memory 11 has one or more memory sections, each containing a plurality of memory locations corresponding, bit-by-bit, to the pixels of LCD output pad 3 and the capacitance row/column intersections of the conductive regions of input pad 2. Each memory section may be considered to represent one page of the sketch pad, upon which graphics may be written for future reference. For this purpose, display memory 11 includes a switch unit under the control of an external page switch, which selects the memory section to be used for the operation of the system. For purposes of simplifying the present description, let it be assumed that display memory 11 contains a pair of memory sections, each of which has a memory capacity corresponding to the display pixel array. Page control switch may be used to select one of these two memory sections for one position of the switch, and the other memory section for the other position of the switch. In this manner, graphics written into one memory section may be stored for later recall and display as will be understood from the more detailed description to follow.

Figure 8B:
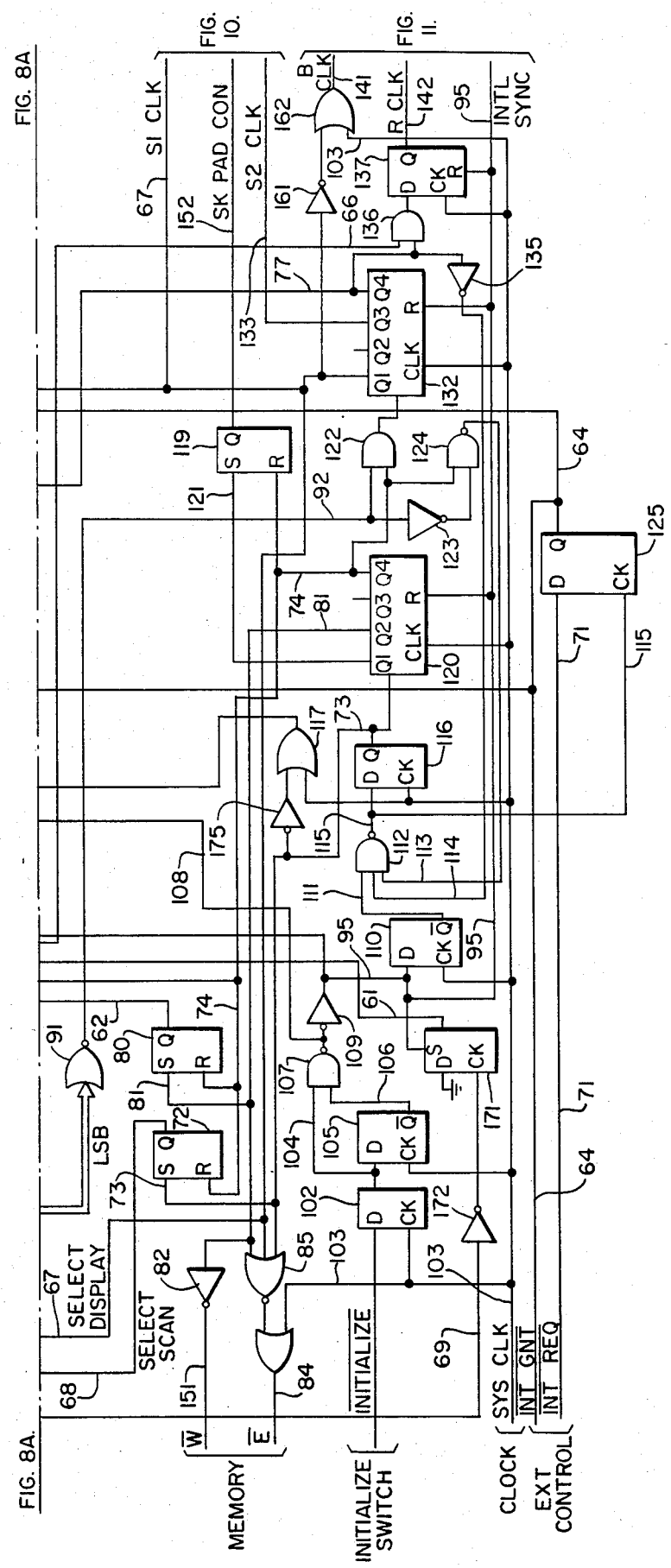

Data originally input to the system by writing on capacitance input pad 2 is written into memory 11 and read out therefrom for display by LCD output pad 3 under the control of a scan control sequencer 12, through I/O scanning electronics unit 13. Scan control sequencer 12, the details of which will be described below in conjunction with the description of FIGS. 8A and 8B, is coupled to the set of switches described briefly above and contains timing signal generator circuitry and combinational control logic for controlling the overall operation of the sketch pad signal processing circuitry. The display memory 11 and scan control sequencer 12 may also be coupled to an external bus interface 14 for permitting data communications to an extended memory or modem. Having described, generally, the various components of which the electronic sketch pad of the present invention is configured, the details of the configuration and operation of the respective individual units of the system will be described next.

CAPACITANCE INPUT PAD

The capacitance input pad is a capacitor switch array formed essentially of an X-Y grid of transparent Indium Tin Oxide conductors deposited on a glass substrate. FIG. 3 shows a top view of a portion of the X-Y grid structure, while FIGS. 4 and 5 show side views of a portion of the same, depicting its layered configuration.

In order to simplify the drawing, only that portion of the grid structure shown in solid line form has been numerically identified and will be described presently. Surrounding conductors have been shown in broken lines and it will be understood that the number of conductive regions of the matrix will vary depending upon the size and shape of the pad. Referring to FIG. 3, each column or X electrode may be formed as a series of square sections, 21 and 22 of which are shown in solid line form, interconnected by a tab 23 at opposing corners of adjacent square sections. Each square section is bounded by tab projections at its opposite vertical or column corners with the edges being denoted by the letters a, b, c, and d. Thus, square section 21 has edges 21a, 21b, 21c, and 21d, while square section 22 has edges 22a, 22b, 22c, and 22d. The intersection of edges 21a and 21b of square section 21 is contiguous with tab 23 which extends to and is contiguous with the corner bounded by edges 22c and 22d of square section 22. Similarly, each row or Y electrode may also be formed as a series of square sections, 31 and 32 of which are shown interconnected by a tab 33 at opposing horizontal or row corners of adjacent square row sections. Thus, at the intersection of edges 31b and 31c of square section 31, tab 33 contiguously extends to the intersection of edges 32d and 32a of square section 32. As viewed in plan, the square sections are spaced apart from each other, so that edge 21b of column square section 21 is spaced apart from edge 32d of square section 31. Similarly, edge 21a of section 21 is spaced apart from edge 31c of section 31, edge 22d of section 22 is spaced apart from edge 31b of sction 31, and edge 22c of section 22 is spaced apart from edge 32a of section 31. It is again to be noted that the illustration of the plan view of the conductive square sections in FIG. 3 is only a portion of the number of square sections of the overall matrix of the pad. To closely match normal linewidths of everyday writing instruments, the linear density of the pad may be on the order of 32 sections per inch. Each individual square section may be 0.020 inches on an edge with 0.032 inches center-to-center spacing, the width of the tab portion being on the order of 0.001 inches. For those square sections that make up the rows of the matrix, the tabs extend from the corners of adjacent row square sections in the Y or row direction, as tab 33 extends between row square sections 31 and 32. For those square sections that make up the columns of the matrix, the tabs extend in the X or column direction, as tab 23 extends between column square sections 21 and 22.

Figure 3:
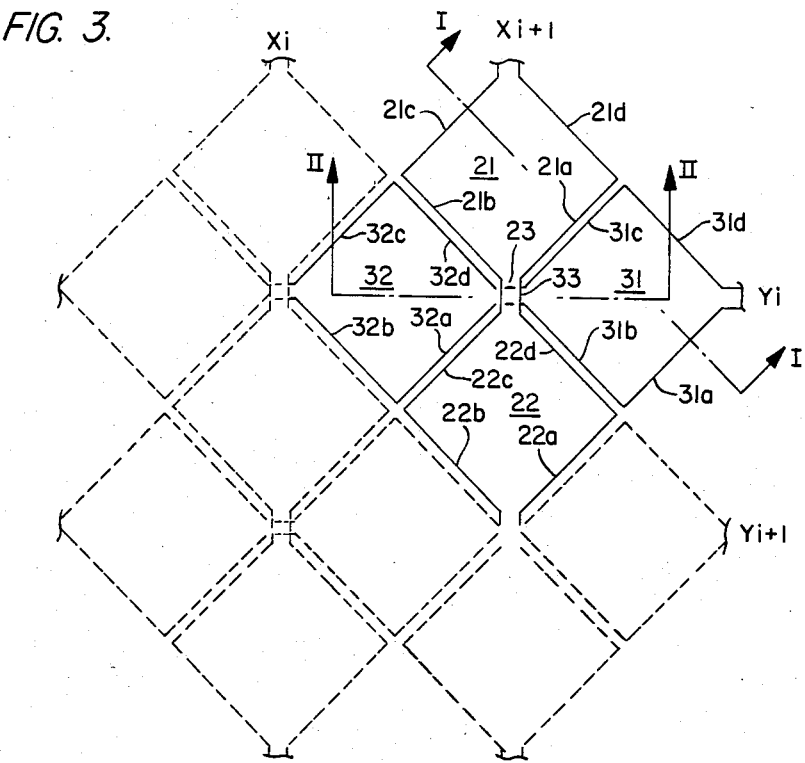
FIG. 3 is a top view of a portion of the X-Y grid structure of a capacitor pixel array input pad.
Figure 4:
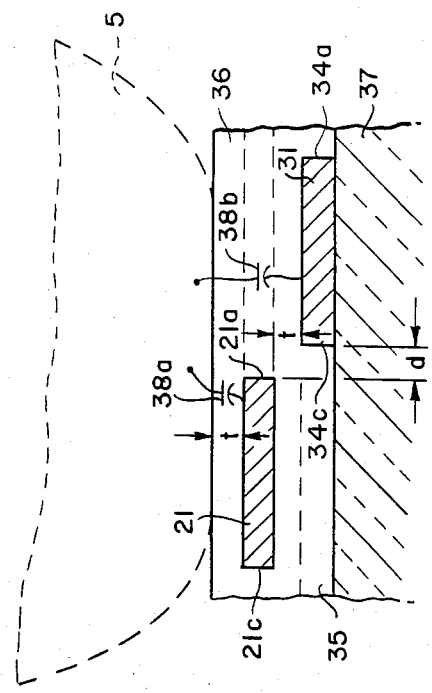
FIG. 4 is a sectional view of the structure of a capacitor pixel array taken along line I—I of FIG. 3.

FIG. 4 shows a side sectional view of a portion of the capacitance input pad taken along line I—I of FIG. 3. The pad is configured of a multiple layer structure of dielectric and conductor and may be formed by conventional lithographic manufacturing techniques. Square section 31 which is one of the transparent conductive row electrodes, is formed of Indium Tin Oxide sputtered, or otherwise deposited, and selectively etched on a glass substrate 37 to a thickness t of about 3000 Å as the row electrodes are deposited. A dielectric layer 35 of Silicon Dioxide or other suitable material is sputtered, or otherwise deposited, over the row electrode pattern to a thickness t of about 3000 Å atop each row section. Next, the column electrode pattern is formed atop dielectric layer 35 to a thickness about 3000 Å, square section 21 of which is shown in FIG. 4. The horizontal separation between adjacent edges of row and column electrodes, e.g. edge 21a of section 21 and edge 31c of section 31, is about 0.001 inch to provide an acceptably low parasitic capacitance. Finally, a top layer of Silicon Dioxide 36 or other suitable material is sputtered or otherwise deposited on the upper column electrode pattern and the exposed surface of dielectric layer 35 to complete the multilayer capacitance structure.

Figure 5:
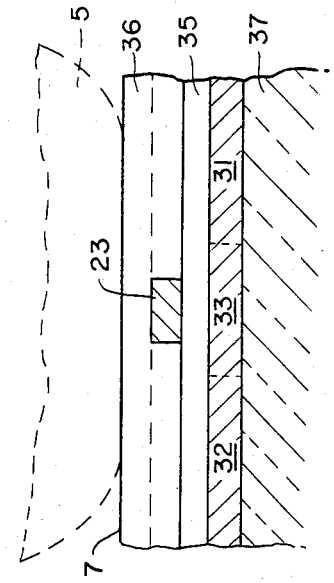
FIG. 5 is a sectional view of the structure of a capacitor pixel array taken along line II—II of FIG. 3.

FIG. 5 shows a side sectional view of a portion of the capacitance input pad taken along line II—II of FIG. 3. Square sections 31 and 32 connected by tab 33 are seen as a continuous metallic layer, the separate sections being delineated by broken lines through the layer. Tab 23 of a column electrode layer lies directly over tab 33 of the row electrode layer therebeneath. When the conductive tip of stylus 5 passes over the surface 7 of the silicon dixoide layer 36 of the capacitance input pad there is a change in the capacitive coupling between the row and column electrodes at that point, which is indicated by capacitances 38a and 38b across dielectric layer 35. This change in capacitive coupling is detected by the scanning electronics, to be described fully below in conjunction with the description of FIG. 10, by sending a digital pulse into each row, each row electrode being pulsed in sequence. Sense buffers are coupled to the column electrodes to detect the degree of capacitive coupling between the row and column electrodes. The frequency of scanning is considerably higher than the movement of the stylus 5 over the surface 7 of the capacitance input pad, so that at each X-Y crossing region over which the stylus passes, there will be a change in capacitive coupling detected by the sense buffers.

STYLUS

Figure 6:
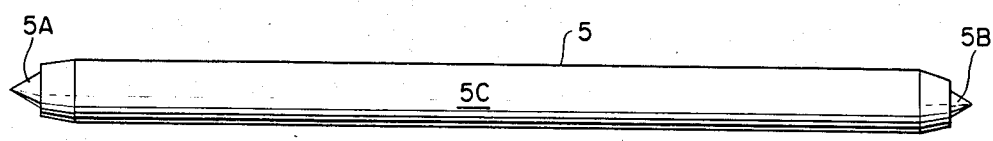
FIG. 6 illustrates the configuration of a writing stylus for use with the electronic sketch pad.

The stylus employed to create the change in capacitive coupling at the X-Y crossovers of the input pad is shown in FIG. 6. The stylus itself may be formed of a cylindrical acrylic rod 5c, the size of an ordinary pencil, at opposite ends of which there are inserted electrically conductive tips 5A and 5B for capacitive coupling the X-Y pixels of the input pad. Each of tips 5A and 5B may be made of resilient, metal-filled plastic having a low coefficient of friction. One suitable material is an RTV potting compound impregnated with silver. The shapes of tips 5A and 5B may have different tapers to provide different basic line widths. In this regard, with a certain degree of "softness" in the stylus tips, the width of a written line may be caused to vary by varying the degree of writing pressure imparted to the stylus, so that the contact area of the tip covers a plurality of X-Y capacitive switch array pixels. Also, the flexibility of the stylus tip enables it to conform to the shape of the pad surface for maximum capacitive coupling to the transparent square regions of the row and column electrodes.

DISPLAY PAD

Figure 7:
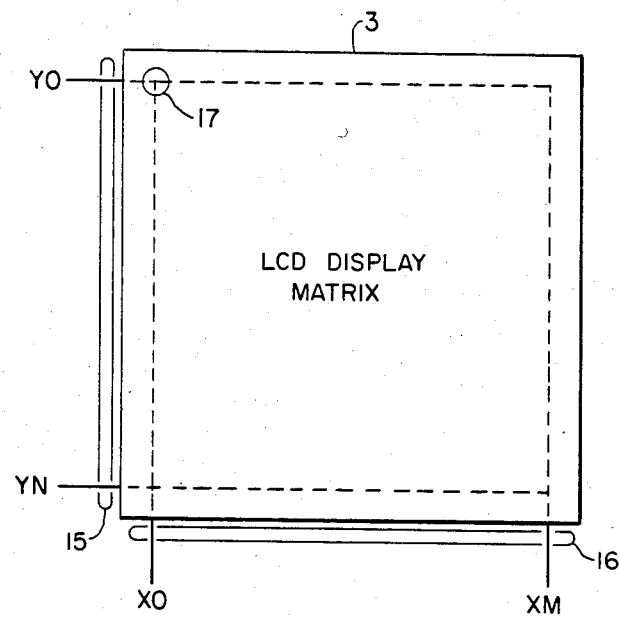
FIG. 7 is an illustration of the general configuration of an LCD pad and its coupling electrode arrangement.

The display pad is formed of a liquid crystal dot matrix having a pixel arrangement in one-for-one coincidence with the capacitor pixels of the capacitance input pad. Such an arrangement is shown generally in FIG. 7, wherein LCD pad 3 is depicted. The pad contains a matrix of pixels, one of which 17 is shown at the intersection of the X1 and Y1 lines of input leads 15 and 16. Leads 15 contain n Y or row driver input lines while leads 16 contain a number m of X or column driver lines. The leads and pixel array are of conventional configuration to provide a matrix of pixels the number and position of which co respond to and are aligned with the X-Y crossovers of the capacitance input pad described above. As the physical construction of such an LCD panel is conventional, a more detailed description of the same will not be presented here. Instead, the description below will focus upon the manner in which the LCD panel is sequentially scanned to create the image graphics to follow the path of the writing stylus.

SCAN CONTROL SEQUENCER

As described previously in conjunction with the description of the general block diagram of the system shown in FIG. 2, control of the operation of the scanning, input and output functions of the input pad 2, and display pad 3, are carried out by a scan control sequencer 12. This unit controls the scan of the capacitance input pad 2, extracts data from the input buffers, updates the data in display memory 11, and controls the multiplexing of the data in LCD pad 3.

Figure 9:
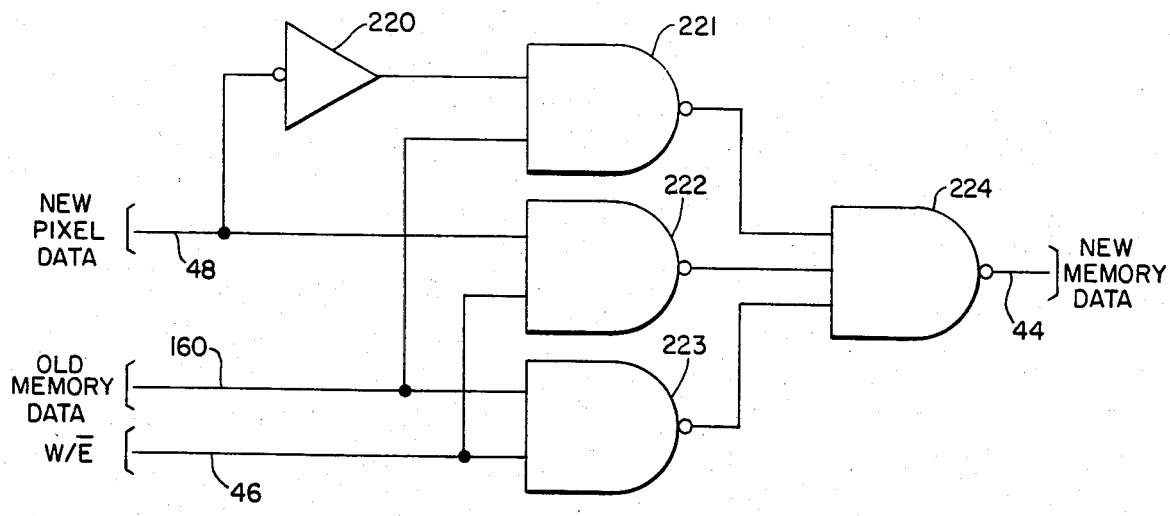
FIG. 9 is a schematic logic diagram of a memory update conversion logic circuit.

Referring now to FIGS. 8A and 8B, a schematic logic diagram of the scanning control sequencer is illustrated. For coupling data to and from the section of display memory 11 as selected by the page switch, a bidirectional, multi-bit data bus 41 is provided. Data bus 41 is coupled to a buffer register 43 into which data read out from memory is controllably latched, as will be explained below. Bidirectional data bus 41 may be an eight bit data bus, although the size of the data bus may be appropriately tailored depending upon system components used and operational requirements, without departing from the scope of the present invention. For purposes of the present description, it will be assumed that data bus 41 is an eight bit bus. When selectively enabled, buffer register 43 latches the data bits that are read out from memory and couples these data bits to a data update decision circuit 45. Data update decision circuit 45 is comprised of combinational logic which receives, in addition to the data read out from memory, data that is produced from the capacitor switch array from the sketch pad scan electronics and updates the state of the data bits from those memory locations currently being addressed, the updated data bits being returned to memory. Within data update decision circuit 45, there are a plurality of memory update conversion logic circuits 50, a detailed configuration for a single one of which is shown in FIG. 9, to be described below. Each of these memory update conversion logic circuits 50 responds to a WRITE/ĒSE/ input control signal on line 46 and selectively updates the value of the data bits for an individual data word read out of memory and returned to memory.

Data that is coupled from the capacitor switch array is coupled over data bus 48. Data bus 48 is coupled also to the LCD pad for driving the LCD elements for the purpose of displaying contents of memory as the respective memory locations corresponding to scanned pixel locations are read out. For this purpose, bidirectional data bus 41 is coupled to a set of tristate driver circuits 47, the outputs of which are coupled to data bus 48. Similarly, the outputs of the memory update conversion logic circuits 50 within data update decision circuit 45 are coupled over a data bus 44 to a set of tristate drivers 42. The states of the various bits of an eight bit word on data bus 44 representative of the current value of data from those locations in memory being addressed are written back into memory through tristate driver circuits 42.

For addressing the display memory 11, either in the read or write mode, a set of address lines 51, the number of which relates to the number of pixels, and therefore the size, of the memory, are coupled to an address driver circuit 52, a set of inputs 53 for which is derived from a multiplexer 54. Multiplexer 54 receives the output of a display address generator 55 or a scan address generator 56, depending upon which of control lines 67 and 68 is enabled. Line 68, representative of the coupling of the contents of the scan address generator 56 through the multiplexer to the memory, is enabled when a prescribed portion of the capacitor switch array is being read out for updating the contents of memory corresponding to that location in the sketch pad. Line 67 is enabled to cause multiplexer 54 to couple the contents of the display address generator 55 to memory during a display mode during which the contents of the memory are read out and delivered to the LCD via data bus 48. In effect, each of the display address generator 55 and the scan address generator 56 is a binary counter, controllably reset by a signal on line 95 during initialization of the system and each of which respectively counts pulses supplied to its clock input via inverters 76 and 75, respectively, from input lines 77 and 74, respectively, as will be explained in more detail below.

For controlling the read and write operations of the scan control sequencer, a set of combinational timing signal generation and control logic in the lower portion of FIGS. 8A and 8B is employed. Included within this logic section is an initialize line 101, coupled to the D input of a flip-flop 102. Flip-flop 102, as well as other flip-flops within the scan control sequencer is clocked by a system clock supplied over link 103. The system clock frequency is chosen according to the desired pixel density, display refresh time, and capacitor switch array scanning period. For the exemplary parameters given above, the system clock frequency may be between 150 KHz and 1 MHz. Initialize line 101 is coupled to an initialization or start switch, not shown, which, when depressed, changes the state of line 101 from a high or a "1" condition to a low or "0" condition. When the state of line 101 goes from a high to a low condition, and then the initialization switch is released, the system is prepared for operation and begins its sequence of operations by way of which the electronic sketch pad operates. This particular function, per se, as well as other events which follow, will be described below during the description of the operation of the system.

The Q output of flip-flop 102 is coupled to the D input of flip-flop 105, which is also clocked by the system on line 103 and the output 106 is coupled to one input of a NAND gate 107. The other input of NAND gate 107 is coupled over line 104 to the Q output of flip-flop 102. NAND gate 107 is employed for controlling the resetting of the system for a one bit clock time as governed by the system clock and the operation of flip-flops 102 and 105. The output of NAND gate 107 is coupled over line 108 to the clear or reset input of buffer register 43. It is also coupled through inverter 109 to line 95. Line 95 is employed to reset the display address generator 55 and the scan address generator 56. Line 95 also sets a timing flip-flop 171, the Q output of which is coupled to one input of a NOR gate 58, the output of which is coupled over line 59 to disable the individual drivers of tristate driver circuit 42 to cause a resetting of the entire memory. A second input of NOR gate 58 is coupled over line 60 to the output of NAND gate 63. One input of NAND gate 63 is coupled over a line 64 to the Q output of flip-flop 125.

Flip-flop 125 is employed to selectively isolate data bus transmissions through the scan control sequencer in response to an interrupt request signal over line 71 which is coupled to the D input of flip-flop 125. This flip-flop is employed for external control purposes and normally remains set or ineffective during the normal operation of the scan control sequencer. A second input of NAND gate 63 is coupled over line 62 to the Q output of flip-flop 80. Flip-flop 80 is employed for selectively enabling the tristate driver circuitry for two clock periods during the writing of data into memory, as will be explained below. Flip-flop 80 is a set/reset flip-flop, the set input of which is coupled over line 81 to the second stage or Q2 output of a shift register unit 120. The reset input of flip-flop 80 is coupled over line 74 to the Q4 stage of shift register circuit 120. Line 74 is also coupled to the reset input of the flip-flop 72. Flip-flop 72 is employed during the sequential scanning of the capacitor switch array to cause multiplexer 54 to couple the output of scan address generator 56 to address link 51. Flip-flop 72 is set by way of line 73 which is coupled to the Q output of a flip-flop delay circuit 116.

Delay flip-flop circuit 116 has its D input coupled over line 115 to the output of NAND gate 112, one input of which is coupled to the $\bar{Q}$ output of flip-flop 110, which is activated initialization, to start the control process, the D input of which is coupled to line 95, referenced above, flip-flop 110 being clocked by the system clock on line 103. NAND gate circuit 112 receives a pair of other inputs over lines 113 and 114 from decision circuitry, to be discussed below, which governs the end of an individual capacitor switch array scan sequence and an individual display scan sequence. The output of NAND gate 112 is also coupled over line 115 to the clock input of interrupt flip-flop 125.

Flip-flop 116, together with shift register 120, operates to execute a scan machine cycle, by enabling buffer register 43 to read the contents of memory into the data update decision circuit 45 and to cause scan address generator 56 to sequentially step through a series of addresses for an individual row of pixel elements within the capacitor switch array. For this purpose, the Q output of flip-flop 116 is coupled through an inverter 175 and OR circuit 117 over line 118 to the clock or load input of buffer register 43. Line 73 is also coupled to the D input of the first stage of shift register 120 and to one input of NOR gate 85. The output of NOR gate 85 is coupled to one input of an OR gate 83, the output of which is coupled over line 84 to an ENABLE input of the display memory 11. A second input of OR gate 83 is derived from line 103 coupling the system clock input to various portions of the system.

Shift register unit 120 is employed to control the timing of a sequence of events which occur during the scan of the capacitor switch array of the electronic sketch pad. Considering, for example, a one inch square pad, having a 32 by 32 pixel array, of capacitor input array, the clock frequency chosen such that each of the pixels of the capacitor input array is scanned at a rate which is capable of tracking human handwriting speed.

It should be observed that the overall size of the sketch pad may vary to meet the demands of the user without departing from the scope of the invention described here. A practical sized pad, comparable to a standard three-by-five card, can be implemented by a 96×160 array of pixels. For purposes of simplifying an illustrative embodiment, the size of the pad will be reduced to a one inch by one inch size having 32 X or column pixel electrodes and 32 Y or row electrodes, so that for this sized pad a 1K (1024 bits) memory chip will be described. Of course, as noted above, the actual size of the sketch pad may typically be considerably larger, requiring more memory space and an adjustment of the timing logic for scanning a greater number of bits per row. Still, the implementaion described here does reflect a practical illustration of the invention and the 32×32 pixel array size has been chosen to simplify its understanding. For the 32 by 32 per square inch capacitor array example given, an individual pixel width is scanned within a period of 128th of a second, in order to be fast enough to track normal handwriting speeds. This scanning rate is approximately four times that employed for reading out the pixels for display, i.e., approximately 32 times a second, which is faster than the integration time of the human eye and avoids a flickering sensation to the viewer.

Referring again to the control logic, the Q output of the first stage of shift register 120 is coupled over line 121 to the set input of a flip-flop 119. The Q output of flip-flop 119 is coupled over line 152 for controllably enabling the output of the scanning logic associated with the pixels of the capacitor switch array of the input pad. When flip-flop 119 is set, the level of line 152 enables the contents of a particular addressed row of pixels of the input pad to be coupled to data bus 48. Since the data bus in this example is eight bits wide, the 32 bit contents of each row are read out in groups of four, as will be explained in more detail below.

The Q2 output of shift register 120 is coupled over line 81 to one of the inputs of NOR gate 85 and to the set input of flip-flop 80. Line 81 is also coupled to an inverter 82, that output of which is coupled over line 151 to the write input of the display memory. As explained previously, flip-flop 80 controls the selective enabling of the tristate drivers of tristate driver group 42. The third stage of shift register 120 is employed simply as a delay to provide for a signal stablization during the signalling or switching scenario of the components of the logic as will be explained in more detail below.

The fourth stage or Q4 output of the shift register 120 is coupled over line 74 as a clock input to the scan address generator 56 and to the reset input of flip-flop 72. Line 74 is 20 also coupled to the reset input of flip-flop 80 and to the reset input of flip-flop 119. In addition, it is coupled to one input of AND gate 122. AND gate 122, together with NAND gate 124 and inverter 123, form a decision logic circuit which determines when four scan machine cycles have been completed. Namely, as explained above, the repetition rate of a scan machine cycle is four times that of a display machine cycle. This higher frequency rate insures that the capacitor switch array is capable of tracking human handwriting speed. In effect, for a 32×32 pixel array, and a data word size of eight bits/word, this decision logic determines when a complete row (four words=32 bits) of pixels of the capacitor switch array have been scanned, for the one inch square example considered here.

Input line 92 which is coupled to the input of inverter 123 and to on input of AND gate 122 is connected to the output of NOR gate 91, the inputs of which are coupled to the least significant bit lines of scan address generator 56. NOR gate 91 changes state for each time the contents of scan address generator 56 have been incremented by a count of four or four address locations, thereby covering a complete scan of one row of pixels of the capacitor switch array, which is scanned at four times the rate of the output display array as noted above. The output of NAND gate 124 is coupled over line 113 to one of the inputs of NAND gate 112. The output of AND gate 122 is coupled to the D input of a shift register unit 132. Shift register unit 132 together with AND gate 136 and flip-flop 137 form the control logic for executing a display machine cycle. Once the decision logic associated with the scan machine cycle, namely AND gate 122, has determined that four scan machine cycles have been completed, a display machine cycle is begun.

For this purpose, the Q1 output of shift register unit 132 is coupled over line 67 to the select display address control input of multiplexer 54 and to one input of NOR gate 85. When the Q1 output of shift register 132 goes high, multiplexer 54 is switched to couple the contents of the display address generator 55 to the display memory. Line 67 is also coupled to one input of AND gate 131 and to an S1 clock input to the capacitor switch array scan control logic. Line 67 is further coupled through an inverter 161 to one input of an OR gate 162, the output of which is coupled over line 141 as a buffer control clock for the buffer control logic of the LCD array shown in FIG. 11. This clock is employed to control the loading of data to be displayed into buffer circuitry associated with the display. A second input of OR gate 162 is coupled over line 103 to the system clock.

The second stage, corresponding to the Q2 output, of shift register unit 132, is employed for signal stabilization purposes and simply acts as a delay. The Q3 output of the third stage of shift register 132 is coupled over line 133 to the scan control logic of FIG. 10 for the capacitor switch array. This line provides an S2 clock which pulses each row of capacitor switch array pixels. The Q4 output of shift register unit 132 is coupled over line 77 to sequentially clock the display address generator 55 which, like scan address generator 56, is essentially formed of a binary counter. Display address generator 55 is incremented for each clock signal generated on line 77. Line 77 also forms one input to AND gate 136 and is coupled through inverter 135 to line 114 or a third input of NAND gate 112. NAND gate 112 effectively disables both the scan machine cycle circuitry and the display machine cycle circuitry until the system has been initalized and sequential scans of both capacitor switch array cells and display pixels are executed.

A second input of AND gate 136 is derived from line 66. Line 66 is coupled to the output of NOR gate 65, which has a pair of inputs coupled to the least significant bit output lines of the display address generator 55. Like NOR gate 91, NOR gate 65 is employed to indicate that the contents of the display address generator 55 have been incremented by a count of four. In effect, AND gate 136 forms a logic decision circuit which, when enabled, and in response to a system clock on line 103, causes the Q output of a flip-flop 137 to go high and advance the scanning electronics for the LCD array to the next row.

OPERATION

Considering now the operation of the scan control sequencer, when the system is turned on, the operator selects, via the page switch, that section of memory 11 to be used, and momentarily depresses an initialize switch (not shown) which changes the stage of line 101 from a normally high condition to a low condition. This places a "0" at the input of flip-flop 102 so that its Q output goes low at the next system clock transition. When the operator releases the initialize switch, a "1" is clocked into flip-flop 102 as its "Q" output on line 104 is clocked into flip-flop 105 at the next clock pulse on line 103. In other words, for one clock period, there is a change in state of the output of flip-flop 105 from its normally low condition to a high condition. This output is coupled through AND gate 107 to cause the contents of buffer register 43 to be reset. Via inverter 109, which is coupled to the output of NAND gate 107, the various system components are reset or cleared, as the signal level on line 95 changes state for that one bit period time interval.

SCAN MACHINE CYCLE

As will be explained below, in conjunction with the operation of the capacitor switch array scan, line 95 effectively causes the scanning circuitry to start at the first row at one side (e.g. the upper left hand corner) of the capacitor switch array. Flip-flop 171 is also set by line 95, with the Q output of flip-flop 171 coupling a signal over line 61 to NOR gate 58. This permits NOR gate 58 to selectively disable the drivers of tristate buffer circuit 42 during the first complete input scan. It should be observed that the clock input of flip-flop 171, via inverter 172, is controlled by the most significant bit stage of the scan address generator 56, so that at the completion of a complete scan, the disabling input for driving the drivers 42 will be terminated.

As the signal on line 95 is coupled through delay flip-flop 110, it causes the state of the output of NAND gate 112 to change so that a "1" is loaded into flip-flop 116. As the Q output of flip-flop 116 changes state, a signal is coupled through OR gate 117 to clock the contents of bidirectional data bus 41 into buffer register 43. Since scan address generator 56 had been previously cleared, its address contents designating the starting address of the scan are those of the memory address position identifying the first eight bit word of the first row of the capacitor switch array being scanned. This eight bit word is thereby coupled over bidirectional data bus 41 into buffer register 43.

As the first stage of shift register 120 goes high, latch flip-flop 119 is set so that line 152 to the sketch pad scan electronics goes high, thereby enabling the readout of the successive rows of the capacitor switch array of the capacitor input pad. Within the scan electronics, the first eight bit word of the thirty-two bits making up the first row is coupled over data bus 48 to data update decision circuit 45.

Figure 10:
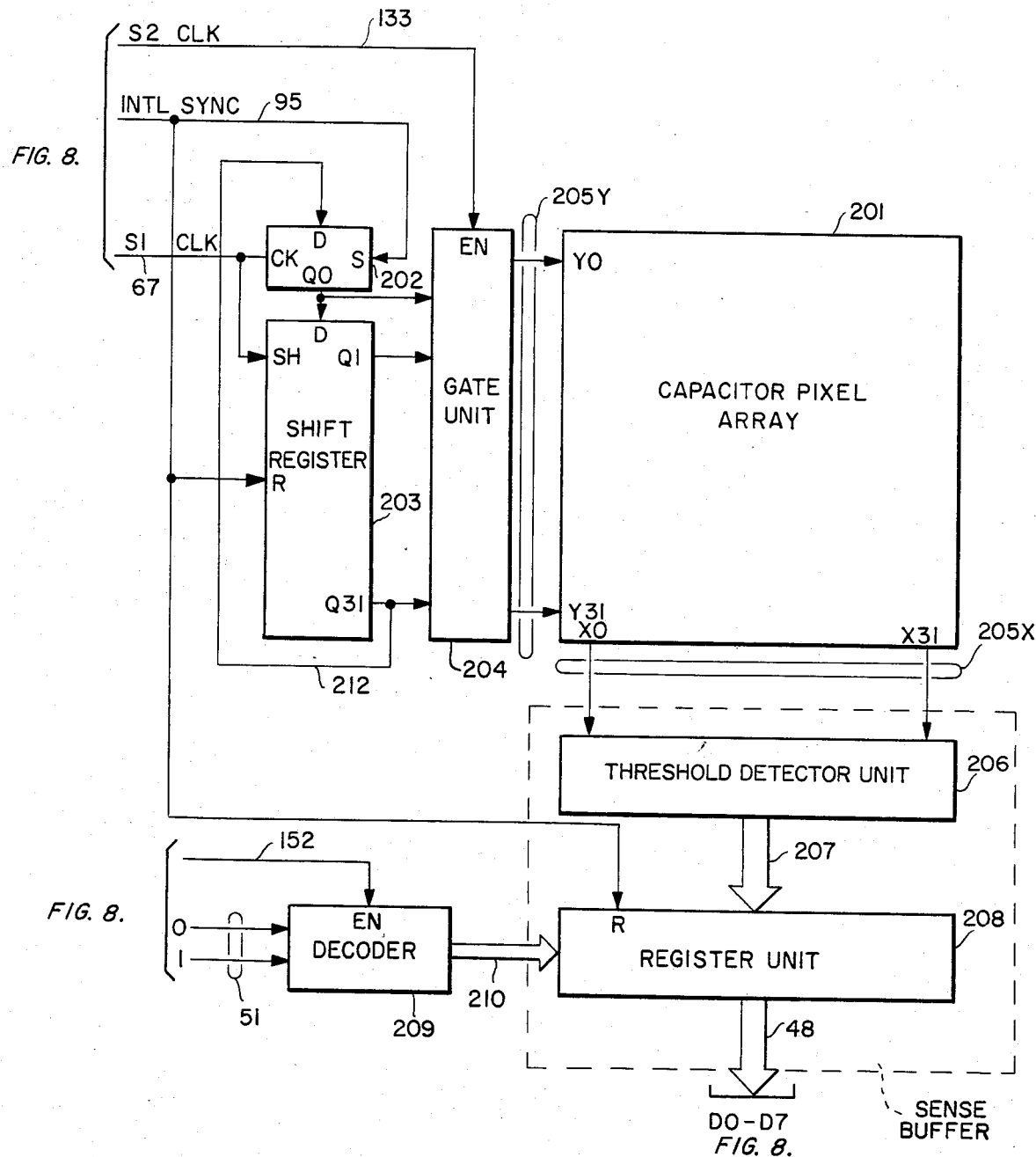
FIG. 10 is a schematic block diagram of the capacitor pixel array scan electronics.

As it turns out, for the first or top most row of the capacitor pixel array, because the initialize line is used to reset or clear the output buffers 208 in FIG. 10 of the capacitor array scan electronics, the eight bit data words coupled over bus 48 from the capacitor switch array are all zeros for the first row (the Y0 row) at the very beginning of system operation. Thereafter, the states of these bits are dependent upon stylus location. This data, together with the contents of buffer register 43 are coupled to the respective memory update conversion logic circuit stages 50 of the decision circuit 45. Depending upon the mode of operation, either WRITE or ERASE, as governed by the state of line 46, the data in memory will have been redefined or made current as governed by both the mode of operation (WRITE or ERASE) and the location of the writing stylus. In either event, the new data is placed on data bus 44 and coupled to tristate driver circuitry 42.

During the next system clock signal, the contents of shift register 120 are shifted rightward so that the Q2 output on line 81 changes state and is latched into flip-flop 80. Its Q output on line 62 thereby enables the tristate driver circuits 42, through NAND gate 63 and NOR gate 58, via line 59, so that the updated eight bit word of interest can be written back into memory 11 over bidirectional data bus 41. In other words, depending upon the pixel location, the mode of operation and the previous contents of the memory, those contents of the address currently being read out from memory 11 are updated and placed back into the memory 11 during the machine scan cycle for the first eight bit word of the first row being addressed by the scan electronics. Two system clock cycles later, as the contents of shift register 120 are shifted over, its Q4 output changes state incrementing the address of scan address register 56 from its previously cleared contents to the next address in memory 11 to be read out. At the same time, AND gate 122 examines the state of line 92 to determine whether or not NOR gate 91 has indicated that four scan machine cycles have been completed, as defined by the contents of the least two significant bits of the scan address register 56. For the first machine cycle, there will be no change in state on the output line 92, so that a signal is not coupled from AND gate 122 to the D input of the first stage of shift register 132. Instead, a signal is coupled over line 113 to again cause a signal to be clocked over line 115 into flip-flop 116 and a scan machine cycle to be begun again. This sequence of events is repeated for the next three scan machine cycles as the contents of the scan address register are incremented and these new respective eight bit words across the first row of the scan are successively read out from memory 11 and, correspondingly, its corresponding eight bit word locations in the capacitor switch array are coupled over link 48 to the data update decision circuitry 45 for updating the contents of the memory for each respective eight bit word. The output of the fourth stage of shift register 120 also resets latch 119. During the successive four machine cycles for a row scan, latch 119 will be immediately set again by the first stage of shift register 120 via line 121. Eventually, however, once four complete scan machine cycles have been completed, a repeat of the scan machine cycle by the coupling of a signal over line 113 to flip-flop 116 will not take place and a display cycle will begin.

DISPLAY MACHINE CYCLE

The beginning of a display machine cycle is controlled by the change in state of the Q1 output of shift register 132. This change in state is coupled over line 67 to the select display address line control input to multiplexer 54. Multiplexer 54 now couples the address contents of the display address 9enerator 55 instead of the scan address 9enerator 56 to the memory 11. Display address generator 55 has been previously cleared, so that it begins at its lowest address position, corresponding to the display address and location in memory previously addressed during the first of the four successive scan machine cycles for the first row of pixels or memory locations. During the present display machine cycle, the system operates to display the contents of the display memory 11 on the LCD board or pad. For the first address position governed by the display generator, an eight bit word is read out of memory over bidirectional data bus 41 and coupled to output driver circuit 47. The Q1 output on line 67 of shift register 132 enables AND gate 131, to thereby enable drivers 47 and couple the first eight bit word for the first row to the LCD scanning circuit. (This Q1 output also clocks the shift register of the row or Y electrode scanning electronics (FIG. 10) to the next row, in preparation for the next capacitor scan machine cycle.)

As will be described below in conjunction with the description of FIG. 11, this first eight bit word is loaded into a buffer memory for display. The next clock cycle (the Q2 bit of shift register 132) is simply used as a delay to permit stabilization of the signal levels within the system for operating the display and the display control components. Subsequently, another clock cycle later, the Q3 output of shift register 132 is coupled over line 133 to the capacitor pixel array scan electronics (FIG. 10). As will be described in detail below, in conjunction with the description of FIG. 10, line 133 supplies an S2 clock so as to deliver an enable signal to gate unit 204 (FIG. 10) and thereby pulse the next row of the capacitor switch array scan electronics, so as to prepare the next row of the capacitor input array for the subsequent four successive scan machine cycles to follow the present display machine cycle. At the next clock cycle, the Q4 output of shift register 132 changes state, incrementing the contents of binary counter or display address generator 55, so that for the next display cycle to follow the forthcoming four scan machine cycles, the display address will read out the second eight bit word of the first row of 32 bits of the LCD. The Q4 output of shift register 132 is also coupled to decision AND gate circuit 136 which examines the state of line 66 to determine whether or not four display machine cycles have been carried out, so that it can proceed to indicate that the next row of the LCD should be addressed for the next display cycle. In the example given, for the very first row and the very first eight bit word, the state of line 66 will be low, so that flip-flop 137 is not set at the next clock cycle. The Q4 output of shift register 132 is coupled through inverter 135 and over line 114 to NOR gate 112. The output of NOR gate 112 is again coupled to the D input of flip-flop 116 at the next clock cycle, so that a new group of four scan machine cycles is begun.

Eventually, for every four scan machine cycles, there is a single display machine cycle and at the end of four display machine cycles or an equivalent of sixteen scan machine cycles, the first row of the LCD will have been illuminated selectively in accordance with the pixel memory contents of the display memory. During that time, four successive rows of the capacitor switch array will have been scanned, in view of the 4:1 capacitor switch array to display scanning speed.

The foregoing scenario of events is repeated sequentially until the entirety of the pixel array of the sketch pad has been scanned. Because of the above ratio of capacitor switch array scan speed to display scan speed, for a pictorial imaging refresh rate of 32 times a second to the viewer to prevent flickering, there is, by definition, a capacitor switch array scanning speed of a complete array scan 128 times per second, which enables normal handwriting speed to be followed, so that it appears to the individual using the electronic sketch pad that the display is exactly following the graphic trace made by the writing stylus. At the and of the complete pixel array scan, the contents of the scan address and dispaly address generators recycle and the complete scan cycle and display cycle, respectively, are repeated. In this manner, whatever graphics are imparted to the capacitor switch array by means of the stylus as it passes over the input pad will be read into memory.

ERASE MODE

Data may be selectively erased from memory by depressing an ERASE switch, (not shown) coupled between line 46 and a reference voltage level thereby changing the state of the WRITE/ERASE line 46 and passing the pixel over the area to be erased, so that the contents of the data lines 48 for the memory locations of interest will cause the data update decision circuitry 45 to selectively erase or convert to zero those data bits encompassed by the stylus movement. Advantageously, using the pliable-typed stylus shown in FIG. 6, the sensation to the user is somewhat like that of the feel of an ordinary pencil eraser passing over glass, and the user sees the previously written graphics disappear as he "erases" them.

When it is desired to completely erase or reinitialize the entire sketch pad, one simply depresses the initialize switch, which clears all memory locations of the memory section being used, and starts the scan machine cycle and display machine cycle scans anew.

MEMORY UPDATE CONVERSION LOGIC (FIG. 9)

As described above in conjunction with the operation of the scan control sequencer shown in FIGS. 8A and 8B, as the stylus is passed over the capacitor switch array pad, data to be displayed by the LCD pad, as read out fromthe display memory 11, is continuously updated depending upon themode of operation and the location of the stylus. For this purpose, the scan control sequencer includes a data update decision circuit 45 which contains a plurality of memory update conversion logic circuits 50 is 50. An individual one of these conversion logic ciructs shown in FIG. 9 and an accompanying truth table for its operation is shown in FIG. 9a.

For the examplary embodiment presently being described, data is read out from memory in eight bit words. These words are loaded in buffer register 43 and then coupled to the data update decision circuit 45 together with the eight bit words that are read out from the capacitor switch array over link 48. Thus, within data update decision circuit 45, there will be eight such memory update conversion logic circuits aa shown in FIG. 9. Referring now to FIG. 9, each logic circuit includes respective input lines for the particular data bits of interest, coupled to a set of combinational logic. One of the bit lines from link 48 is coupled to an inverter 220 and one input of a NAND gate 222. The corresponding bit output line from data buffer register 43 is coupled to one input of NAND gate 221 and one input of NAND gate 223. The other input of NAND gate 221 is coupled to the output of inverter 220. The WRITE/ERASE mode control line 46 is coupled to one input of NAND gate 223 and one input of NAND gate 222. The outputs of each NAND gate are coupled to a respective input of a further NAND gate 224, the output of which is coupled to one of the bit lines of link 44.

The operation of the circuit shown in FIG. 9 is readily understood by reference to the truth table shown in FIG. 9a. In normal operation, which is considered to be the write mode, line is coupled to a voltage level representative of a binary "1". During the erase mode, when the WRITE/ERASE switch is depressed, the voltage level coupled to line 46 changes from a "1" to a "0". Thus, during the write mode, the contents of display memory 11 remain unchanged unless the stylus passes over a pixel location which had previously not been activated. In this circumstance, the new data will cause the contents of the memory location being addressed represented by the particular bit line of interest to be converted to a 1.

During the erase mode, the passing of the stylus over a particular pixel position will cause the contents of the memory the address of which corresponds to that pixel position to be converted to a 0, so that any illuminated pixel over which the stylus passes will be extinguished.

SKETCH PAD SCAN ELECTRONICS

The scanning electronics for sequentially scanning the row and columns of the capacitor switch array of the input sketch pad under the control of the scan control sequencer are illustrated in FIG. 10. The capacitor switch array itself is designated as a unitary element 201. Keeping with the convention previously adopted in connection with the description of the present invention, especially the exemplary pixel arrangement for a 32 by 32 array, the row or horizontal pixel conductors are designated as Y0–Y31, while the column or vertical conductors are designated as conductors X0–X31. Again, it is to be noted that the density of the pixels is not limited to a 32×32 per square inch array but may vary depending upon the desired configuration and resolution. Moreover, as the size of the sketch pad changes, the actual total number of pixels will change accordingly. For purposes of the present description, the example has focussed upon a one square inch array of 32 row conductors and 32 horizontal conductors providing a total number of 1,024 pixels.

In order to scan the individual pixel rows, a shift register scanning configuration is employed. This shift register scanning arrangement includes a top row-designating flip-flop 202 and a shift register 203 connected in cascade to flip-flop 202 so that, in effect, both flip-flop 202 and shift register 203 form a row scanning shift register. Shift register 203 consists of 31 flip-flop stages, the Q1–Q31 outputs of which together with the Q0 output of flip-flop 202 are coupled to a gate unit 204 which may comprise a plurality of individual gate circuits, one input of each of which is connected in common to S2 clock line 133. The other input of each of the respective gates is connected to one of the Q outputs of the flip-flop 202 and the stages of shift register 203. When strobed in common by a signal on line 133, that one of the gates of gate unit 204 which is enabled by a respective one of the Q0–Q31 outputs of the shift register arrangement will cause the corresponding Y conductor of output link 205 Y to be strobed.

The sequential addressing or stobing of these Y conductors is effected by initially loading the first flip-flop of the shift register arrangement, namely flip-flop 202, with a "1". This is accomplished by the signal on line 95 in response to the initialization of the scan control sequencer, described above in conjunction with the description of FIGS. 8A and 8B. Line 95 is connected to the set input of flip-flop 202 and to the reset input of each of the flip-flop stages of shift register 203 and to reset inputs of the stages of register unit 208. When line 95 changes state at the initialization of the system, as described previously, a "1" is loaded into flip-flop 202, causing its Q0 output to go high and each of the stages of shift register 203 and register unit 208 is reset. Subsequently, in response to successive scan strobe pulses for indexing the successive rows, namely the S1 clock signals on line 67, the contents of the various stages of the flip-flop arrangement are shifted along in series from one stage to the next. The Q31 output of the last stage of the shift register 203 is looped to the D input of flip-flop 202, so that the row scanning arrangement is connected in a ring configuration. Thus, once the initial "1" is loaded into flip-flop 202, it is subsequently shifted along by the S1 clock on line 67, and that gate of gate unit 204 which is coupled to the flip-flop stage presently containing the shifted "1" will be enabled when gate unit 204 is strobed by a signal on line 133, thereby strobing the corresponding row conductor Yi of the capacitor switch array.

For reading out the contents of the capacitor switch array, its X or column conductors are coupled via link 205X to a sense buffer containing a threshold detector unit 206 and register unit 208. Threshold detector unit 206 contains a plurality of threshold detectors, one coupled to each column or X electrode via one of the lines of line 205X. Assuming there has been a change in capacitance created by the passing of a stylus over a capacitor pixel, when the row in which that pixel is included is strobed by the output of gate unit 204, a signal will be transmitted over one or more of the lines X0–X31 of link 205X to threshold detector unit 206. Within the threshold detector unit 206 each of the plurality of threshold detectors, one for each column conductor, compares the outputs of the individual lines of link 205X with a predetermined threshold voltage set to identify a change in pixel capacitance created by the stylus. Those detectors which have detected a change in capacitance couple their outputs over link 207, which includes a plurality of respective conductors for each of the column lines, (in the example given 32 conductors) to be coupled to a respective group of registers within a register unit 208. Since, in the example described, each row of 32 pixels is read out eight bits at a time, register unit 208 may contain four sets of latch registers, each eight bits wide. The addressing of these individual registers is controlled by the output of a decoder 209 over link 210. Decoder 209 receives the two least significant bits of the memory address bus 51 and, when enabled by the signal on line 152 indicative of the carrying out of a capacitor switch array scan machine cycle, as described above in conjunction with the description of FIGS. 8A and 8B, that one of registers within register unit 208 corresponding to the eight bit pixel group presently being read out of memory 11 will be addressed by link 10, and the states of the pixels, as determined by threshold detector 206 will be coupled over eight bit data link 48 to the data update decision circuit 45 in FIGS. 8A and 8B, as explained previously.

Thus, by virtue of the operation of the individual sequential scan carried out by the row shift register scan arrangement and the grouped column scan arrangement carried out by decoder 209, multiple (eight in the present example) bit words are read out from each row across the row. As an example, assuming that the third row Y2 is being addressed or designated by the Q2 contents of shift register 203, when gate unit 204 is strobed by the S2 clock on line 133, those capacitor pixels over which the stylus has passed will be identified by threshold detector unit 206 as being coupled to the stylus and the states of these pixels will be loaded into register unit 208. Those pixels of the scanned row which the stylus has not affected will remain unchanged; however, their states, whether it be a "1" or a "0", will be loaded into register unit 208. Depending upon the states of the two LSB lines of address link 51, register unit 208 will couple the states of those eight pixels (namely either pixels X0–X7, X8–X15, X16–X23, or X24–X31) coupling to the data update decision circuit 45.

LCD SCAN/DRIVER

A schematic block diagram of the LCD scan/driver is illustrated in FIG. 11. Like the sketch pad scan electronics configuration shown in FIG. 10, the LCD scan/driver is basically configured of row and column sequential scanning circuitry coupled to the X (or column) and Y (or row) conductors of the LCD pad itself. The LCD pad 250 is shown schematically as a unitary component in order to simplify the drawings. As pointed out previously, the LCD itself may be any one of commerically available LCD matrix configuration. Conventionally, such display configurations include associated driver circuitry shown schematically in FIG. 11 as row driver unit 255 and column driver unit 258. For a 32 by 32 array in the exemplary embodiment described herein, there are respective row conductor coupling links 256 and column conductor coupling links 257 coupling the 32 row conductors Y0–Y31 from row drivers 255 and the 32 column conductors X0–X31 from column drivers 258.

In order to sequentially scan or address the respective pixels of the LCD, a row address register unit 252 and a column address register unit 260 are employed. Row address register unit 252 may comprise a 32 stage shift register, the respective Q outputs of which are coupled to individual drivers 255 for the row conductors Y0–Y31 via link 254. Associated with the first stage of shift register 252 is a flip-flop 251, employed for the purpose of initializing the scan at the top row or the Y0 row. The Q output of flip-flop 251 is coupled to the D input of the first flip-flop of the first stage of shift register 252. Flip-flop 251 is initially set by the internal sync signal on line 95 from the scan control sequencer (FIGS. 8A and 8B). This signal is also employed to reset each of the 32 stages of shift register 252. Clocking of the respective stages of the shift register 252, as well as flip-flop 251, is effected by the R clock on line 142 from the scan control sequencer. This clock is also employed to clock the register unit 260 for scanning the column drivers, as will be described below. Flip-flop 251 and shift register 252 are coupled in a ring or loop configuration, via line 253, so that the "1" bit which is loaded into flip-flop 251 and the first stage of shift register 252 in response to the internal sync signal on line 95 will be sequentially shifted through the shift register and re-routed back to its first stage.

In order to prevent the building of a D.C. voltage on the LCD elements of display 250 as a result of this repeated sequential scanning, a voltage inversion circuit is required. However, rather than employ a separate inversion control circuit for each row or column, as is customary practice, the LCD driver electronics of FIG. 11 employs a single control circuit 280 which is coupled to each row and column driver in parallel. Inversion control circuit 280 is activated by the output of one of the stages of row register unit 252, so that it causes drivers 255 and 258 to supply a D.C. inversion voltage to the LCD pixels once a complete display cycle, rather than for each row cycle. For this purpose, line 279 may be coupled to the output of the next to last stage, i.e. row Y30, of register unit 252, so that at the R clock on line 142 which causes the last or Y31 row to be addressed for the lowest row of the display, prior to a new display scan on row Y0, the inversion voltage between display cycles may be imparted to the LCD pixels. This lower frequency of D.C. inversion increases the speed of operation of the system and thereby increases the size of the display that may be accomodated.

For addressing the 32 column electrodes X0–X31, data on link 48 from the scan control sequencer is initially loaded into a switched latch unit 262 under the control of the B clock on line 141. Switched latch unit 262 is comprised of a plurality of register stages having four eight bit output links 261 coupled to register unit 260. Register unit 260 may comprise a 32 bit register, the respective outputs of which are coupled over link 259 to the 32 column drivers of column driver unit 258. When clocked by the B clock on line 141, switched latched unit 262 loads the data bits from the scan control sequencer on link 48 into switched latch unit 262 and couples these data bits over one of the four eight bit data links 261 to the register unit 260. With the next B clock, new data is made available on link 48 and this data is coupled over the next one of the four eight bit data links 261 to the register unit.

In operation, when the system is initialized, as described previously in conjunction with the description of the scan control sequencer in FIGS. 8A and 8B, the internal sync signal on line 95 sets flip-flop 251, causing its Q output to go high and resets each of the stages of shift register unit 252. Upon the appearance of the R clock on line 142, the state of the Q output of flip-flop 251 is loaded into the first stage of shift register 252 thereby enabling the first row driver circuit of row driver unit 255 impressing the required LCD driving voltage on the Y0 row line of link 256 to the LCD 250. At the appearance of the B clock on line 141, the eight bits of data from the scan control sequencer will be coupled into latch 262 and over that one of links 261 containing the X0–X7 data bits for the leftward most group of eight data bits for the column conductors of the LCD pixels. With the appearance of the next B clock, the new data on link 48 is coupled through switch latch 262 to the next group of eight conductors of link 261 to register unit 260, for conductors X8–X15. This operation continues for the next two B clock signals on line 41 for the total loading of the first or Y0 row of pixels. With the appearance of the next R clock 142, the "1" bit in the first stage of shift register 252 is shifted to the second stage, so that the Y1 line from row driver unit 255 will be energized with the necessary driving voltage, and the row data in latch unit 262 is clocked into register 260 for the next row refresh. At the appearance of the next B clock, the switched latched unit 262 couples again the input on data link 48 to the X0–X7 conductor link and the load begins anew for the second row.

As will be appreciated from the foregoing description of the electronic sketch pad in accordance with the present invention, there is provided a compact unit that advantageously is capable of tracking handwriting speeds and providing directly beneath the location of the stylus an effective real time display of the track of the stylus. With a conductive-tipped stylus, the surface area of which may be varied by controlling hand pressure, a variable width line can be obtained with the increased pixel densities afforded by the present invention. It has also been found that the creation of an image is not limited to the use of a stylus, but any medium which offers a conductive coupling interface to the capacitor pixels of the input pad. In this regard, a signature or other graphics generated by a carbon pencil on an ordinary note card, when pressed against the surface 7 of the sketch pad, will cause a face-down image of the signature or graphic to be displayed by the sketch pad. Thus, the present invention offers significant versatility with respect to not only its size, but with respect to its information coupling capability.

Moreover, as the graphics written on the pad is stored in standard data blocks (eight bit bytes) in a random access memory, the pad is readily suited to be interfaced with contemporary data communications equipment, so that it may be used as a remote input/output device.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. A display device comprising:
a transparent array of variable capacitance pixels supported by way of a first member, each variable capacitance pixel undergoing a change in capacitance in response to the coupling of a conductive medium at the surface of said first member;
an array of display element pixels supported by way of a second member positioned adjacent said first member, so that said array of variable capacitance pixels overlies said array of display element pixels, each of said display element pixels being selectively energized in response to control signals applied thereto; and
control means, coupled to said transparent array of variable capacitance pixels and said array of display element pixels, for scanning said transparent array of pixels and selectively causing a prescribed control signal to be coupled to a respective display element pixel corresponding to a respective variable capacitance pixel at which a change in capacitance has been detected.

2. A display device according to claim 1, wherein said control means includes a memory having a plurality of memory locations corresponding to the respective arrays of said variable capacitance pixels and display element pixels, said memory locations storing data representative of the respective control signals in response to which said display element pixels are selectively energized.

3. A display device according to claim 2, wherein said control means further comprises means for scanning the variable capacitance pixels of said transparent array at a rate compatible with handwriting speeds and, in response to the movement capacitance change-inducing writing stylus over the surface of said first member, applying selective energization representative control signals to those display element pixels, the locations of which in said array of display element pixels correspond to the locations of the variable capacitance elements whose capacitance is changed by the coupling of said stylus thereto as it is moved over the surface of said first member.

4. A display device according to claim 2, wherein said control means comprises means, coupled to said memory and to said transparent array of variable capacitance pixels, for selectively combining data from memory locations in said memory with signals derived from said transparent array associated with pixels corresponding to respective ones of said memory locations, and replacing the data from said memory locations with new data corresponding to the resultant selectively combined signals.

5. A display device according to claim 4, wherein said control means further comprises means for coupling the data stored in the memory locations of said memory to the pixels of said display element pixel array, whereby said display element pixels are selectively energized in response to changes in capacitance of the pixels of said transparent array.

6. A display device according to claim 1, wherein said control means comprises means for applying capacitance pixel scan signals to each of the pixels of said transparent array at a rate which is greater than the rate at which prescribed control signals are coupled to said array of display element pixels.

7. A display device according to claim 2, wherein said control means comprises means for cyclically scanning all the capacitance pixels of said transparent array and, at each scan of a capacitance pixel, causing the data stored in the location in memory corresponding to that pixel to be updated in dependence upon a signal derived from the scan of said pixel representative of the capacitance state thereof.

8. A display device according to claim 7, wherein said control means comprises means for cyclically scanning all the display element pixels of said display element pixel array at a rate which is rapid enough to prevent the sensation of flickering to a viewer.

9. A display device according to claim 8, wherein the rate at which the capacitance pixels of said transparent array are scanned is faster than the rate at which the display element pixels ar scanned.

10. A display device according to claim 9, wherein the rate at which the capacitance pixels are cyclically scanned is rapid enough to track handwriting speed over the surface of said first member.

11. A display device according to claim 4, wherein said control means includes means, responsive to a first mode of operation representative signal, for causing the respective display element pixels, for which corresponding ones of the scanned capacitance pixels of said transparent array have undergone a prescribed change in capacitance, to be placed in a display state.

12. A display device according to claim 11, wherein said control means includes means, responsive to a second mode of operation representative signal, for causing the respective display element pixels, for which corresponding ones of the scanned capacitance pixels of said transparent array have undergone a prescribed change in capacitance, to be placed in a non-display state.

13. A display device according to claim 2, wherein said memory includes a plurality of memory sections each of which contains a respective plurality of said memory locations and wherein said control means includes means for selectively accessing one of said memory sections for coupling data relative thereto with respect to said transparent array and said array of display element pixels.

14. A display device according to claim 2, wherein each of said arrays is comprised of a respective matrix of row and columns of a plurality of pixels each, and wherein said scanning means includes means for sequentially applying a row scan signal to each row of capacitance pixels, so that, for each respective row, all the capacitance pixels of that row are scanned by the same scan signal.

15. A display device according to claim 14, wherein said scanning means further comprises means, coupled to each column of pixels of said transparent array, for detecting a change in capacitance at any pixel in the row being scanned in response to the coupling of a conductive medium to the surface of said first member overlying said any pixel during the scanning of said row.

16. A display device according to claim 15, wherein said control means further comprises readout means, coupled to said change in capacitance detecting means, for supplying to locations in said memory, corresponding to the pixels in the row being scanned, signals representative of the capacitance states of the scanned row pixels.

17. A display device according to claim 14, wherein said control means comprises means for sequentially applying a row address signal to each respective row of display element pixels and causing prescribed control signals to be applied to the display element pixels of the row to which the row address signal is applied, in accordance with data stored in the locations of said memory corresponding to said addressed row.

18. A display device according to claim 2, wherein each of said arrays is comprised of a respective matrix of rows and columns of a plurality of pixels each and wherein said control means comprises means for sequentially applying a row address signal to each respective row of display element pixels and causing prescribed control signals to be applied to the display element pixels of the row to which the row address signal is applied, in accordance with data stored in the locations of said memory corresponding to said addressed row.

19. A display device according to claim 18, wherein said display element pixel array is a liquid crystal display array.

20. A display device according to claim 19, wherein said control means includes means for coupling a voltage inversion signal to all the elements of said liquid crystal display array once per cyclical addressing of all the rows of the display matrix.

21. A display device according to claim 1, wherein said transparent array of variable capacitance pixels is configured of first and second layers of selectively formed conductive regions spaced apart from one another by a thin layer of dielectric material therebetween.

22. A display device according to claim 21, wherein said control means includes first means for applying a prescribed signal to one of said first and second layers and second means is coupled to the other of said first and second layers for detecting a change in capacitance of said pixel in response to the coupling of said conductive medium thereat and the application of said prescribed signal by said first means to said one of said first layers.

23. A display device according to claim 21, wherein a row of capacitance pixels is formed of a plurality of relatively large area conductive regions disposed successively adjacent to one another, and a plurality of relatively small area conductive regions successively interleaved with and joining together the relatively large area conductive regions.

24. A display device according to claim 23, wherein the distance between the small area conductive regions of adjacent rows is greater than the distance between the large area conductive regions of adjacent rows.

25. A display device according to claim 21, wherein a column of capacitance pixels is formed of a plurality of relatively large area conductive regions disposed successively adjacent to one another, and a plurality of relatively small area conductive regions successively interleaved with and joining together the relatively large area conductive regions.

26. A display device according to claim 25, wherein a row of capacitance pixels is formed of a plurality of relatively large area conductive regions disposed successively adjacent to one another, and a plurality of relatively small area conductive regions successively interleaved with and joining together the relatively large area conductive regions, and wherein the relatively large area regions of the rows and columns are interleaved with one another, while the relatively small area conductive regions of the rows and columns overlap one another.

27. A display device according to claim 26, wherein each relatively large area conductive region has a generally square shape, and the relatively small conductive regions join generally square-shaped regions at those opposite corners thereof in the direction along which the regions are successively adjacent one another for a respective row or column.

28. A display device according to claim 1, wherein said transparent array of variable capacitance pixels, said array of display element pixels, and said control means are configured within respective thin pads assembled in a laminar structure thereby forming a thin substantially flat device.

29. A display device according to claim 3, wherein said writing stylus has a generally elongated shape, one end of which contains a tip made of a conductive pliable material.

30. A variable capacitance transducer device comprising:
a substrate upon which is provided a matrix of variable capacitance elements configured of a first and second layer of selectively formed conductive regions spaced apart from one another by a thin layer of dielectric material therebetween;
means for selectively applying an electrical signal to rows of conductive regions of which one of said layers if formed; and
means, coupled to each of the columns of conductive regions of which the other of said conductive layers is formed, for detecting a change in the capacitance between said first and second layers in response to the coupling of a conductive medium to said layers while said electrical signal is applied by said first means; and wherein
each of said layers is formed of transparent conductive material, thereby forming a matrix of capacitive pixels; and wherein
a column of capacitance pixels is formed of a plurality of relatively large area conductive regions disposed successively adjacent to one another, and a plurality of relatively small area conductive regions successively interleaved with and joining together the relatively large area conductive regions; and wherein
a row of capacitance pixels is formed of a plurality of relatively large area conductive regions disposed successively adjacent to one another, and a plurality of relatively small area conductive regions successively interleaved with and joining together the relatively large area conductive regions, and wherein the relatively large area rgions of the rows and columns are interleaved with one another, while the relatively small area conductive regions of the rows and columns overlap one another.

* * * * *